United States Patent [19]
Lalander

[11] Patent Number: 5,311,418
[45] Date of Patent: May 10, 1994

[54] HVDC DC TO DC CONVERTER WITH COMMUTATING TRANSFORMER

[76] Inventor: Magnus Lalander, Kyndelstigen 9, Ludvika, S-771 43, Sweden

[21] Appl. No.: 849,069

[22] PCT Filed: Nov. 2, 1990

[86] PCT No.: PCT/SE90/00710
§ 371 Date: Apr. 22, 1992
§ 102(e) Date: Apr. 22, 1992

[87] PCT Pub. No.: WO91/07807
PCT Pub. Date: May 30, 1991

[30] Foreign Application Priority Data
Nov. 20, 1989 [SE] Sweden .................. 8903883

[51] Int. Cl.[5] .......................... H02M 3/315
[52] U.S. Cl. ......................... 363/27; 307/82
[58] Field of Search .......... 363/27, 28, 35; 307/82; H02M 3/305, 3/315

[56] References Cited

U.S. PATENT DOCUMENTS

| 3,460,020 | 8/1969 | Quinn | 363/17 |
| 3,942,089 | 3/1976 | Kanngiesser | 307/82 |
| 4,477,868 | 10/1984 | Steigerwald | 363/28 |

FOREIGN PATENT DOCUMENTS

| 213270 | 10/1985 | Japan | 363/27 |
| 752743 | 7/1980 | U.S.S.R. | 363/27 |
| 779985 | 11/1980 | U.S.S.R. | 363/27 |
| 881949 | 11/1981 | U.S.S.R. | 363/27 |
| 1083310 | 3/1984 | U.S.S.R. | |

OTHER PUBLICATIONS

E. W. Kimbark "Direct Current Transmission", vol. I, Chapters 2 and 3, pp. 48–123, 1971, John Wiley & Sons.
K. Thorborg "Power Electronics", Chapter 6, pp. 172–179 and Chapter 7, pp. 224–257, 1988 Prentice-Hall International (UK) Ltd.
A. Ekstrom "Kimpendium i Hogeffektelektronik", 7., pp. 1–30, Kungl. Tekniska Hogskolan/EKC Elkraftcentrum Jan. 1988.

*Primary Examiner*—William H. Beha, Jr.
*Attorney, Agent, or Firm*—Young & Thompson

[57] ABSTRACT

A DC/DC power transformer is provided which is an arrangement for direct transformation of high electric power from one DC voltage level to another DC voltage level without an intermediate AC voltage network. The DC voltage is today basically used for transmission of high electric power at long distances. The DC voltage levels for these transmissions are normally high. The DC/DC power transformer allows several DC voltage levels to be used in one and the same DC voltage network. The principle for this arrangement is that the valve windings (43, 45) from one or several converter transformers (47) are connected to two valve bridges, which generate opposing cyclically varying magnetic flows in the transformer cores (44). One of the valve bridges is operated as an inverter (42) and the other as a rectifier (46) and in this manner the power is transformed from one DC voltage level ($U_{d1}$) to another ($U_{d2}$). At high voltage levels the leakage inductances in the transformers will be high as a consequence of the insulation levels and therefore special arrangements must be made in order to commutate the magnetic energy from one phase of the transformer to another without creating great losses.

3 Claims, 8 Drawing Sheets

HVDC DC TO DC CONVERTER WITH COMMUTATING TRANSFORMER

BACKGROUND OF THE INVENTION

1. Field of the Invention

This invention relates to an arrangement for direct transformation of electric power from one DC- (=direct current) voltage to another DC-voltage.

2. Description of the Prior Art

In power transmission DC-voltage is used to transmit high electric power from production centers to consumption centers. Since the power is generated and distributed with AC networks (1,2) it is necessary to transform the AC-voltage to a DC-voltage ($U_d$ in FIG. 1) by means of a rectifier (3) and on the other end retransform the DC-voltage to an AC-voltage by means of an inverter (4). These convertors are composed of converter transformers (5, 6) and valves (7) which are connected into valve bridges (8, 9). The rectifier and the inverter as well as the valve bridges are known and described in reference 1, chapter 2 and 3.

Figure 1:
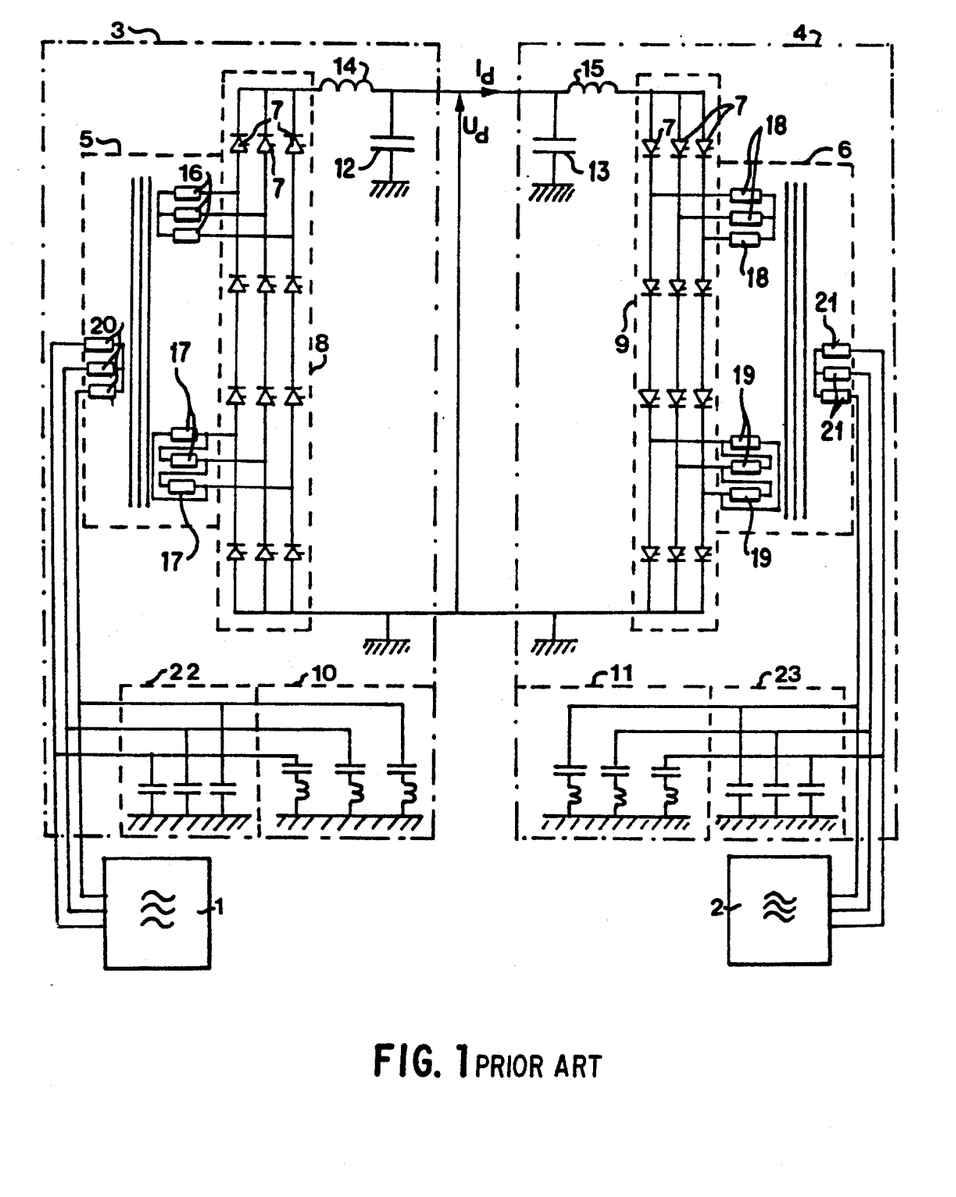
In FIG. 1 is shown the known high voltage DC transmission.

The rectifier and the invertor can be provided with filters on the AC-voltage side (10, 11) as well as on the DC-voltage side (12, 13). These filters as well as the smoothing reactor (14, 15) on the DC-voltage side are provided in order to filter harmonics in current and voltage, which are generated as a consequence of the transformation from AC- to DC-voltage and vice versa. Each rectifier or inverter consequently needs a lot of equipment which also generates a lot of losses. This has strongly restricted the utilization of high voltage direct current as a means of transmitting electric power.

With technology known today relating transformation of electric power from one high voltage DC-voltage level to another high voltage DC-voltage level, the power is converted to an AC-voltage by means of an alternator and then converted to the other DC-voltage level by means of a rectifier. Another known arrangement relates to a series connection of a couple of converters for increasing or decreasing of the DC-voltage level in proportion to the power supplied to or withdrawn from the AC-voltage network (compare reference 2).

Known arrangements of DC/DC transformation for low voltage application (se e.g. chapter 7 in reference 3) are not suitable for power transmission and high voltage equipment, due to the high requirement for low noise interference, low losses and high insulation levels, and the high leakage inductances in the transformers related to the high voltage levels.

The known rectifier (3) and inverter (4) are drawn in FIG. 1. In the figure a 12 pulse configuration is illustrated with star- and delta-connected converter transformers, which is the most common configuration today. This known configuration and corresponding firing sequence is described in chapter 2.9 of reference 1. In the 12-pulse configuration the firing varies cyclically from one valve to another in each 12-pulse group (8, 9). The two series connected 6-pulse groups in each rectifier and the inverter are phase shifted 30° since transformer valve windings in the upper group are star connected (16, 18) and in the lower group are delta connected (17, 19). Due to restrictions in maximum power handling capacity of each transformer unit the transformer windings may be divided in one, two, three or six units. In each of these units there must be at least one AC-winding (20, 21) with the same phase shift as the valve windings in the respective transformer unit. The greatest quantity of transformer units and the lowest power handling capacity per unit is achieved if only one valve winding and corresponding AC winding is placed in one and the same transformer unit.

Since rectifying and inversion with today's power technology is performed with line commutated valves, the firing and extinction is achieved only with certain firing angle, α, and extinction angle, γ, respectively. Commutation from the valve winding of one phase, to a valve winding of another phase will only be achieved with a certain overlap angle, u due to the transformer leakage inductance. Due to these a certain phase shift between the voltage and the current is created during the rectification and the inversion processes. This results in a deficit of reactive power as described in reference 2. In order to compensate for this it has become useful to provide the convertors not only with ac-filters (10, 11) but also with shunt capacitor banks (22, 23) for generation of reactive power. The DC-current control is an essential function of the known DC-voltage transmission. The line direct current ($I_d$ in FIG. 1) in the known DC voltage transmission is controlled by the DC voltages in the converter stations through the formula:

$$I_d = \frac{U_d^R - U_d^I}{R} \quad \text{wherein}$$

$I_d$ = Line DC-current
$U_d^R$ = DC-voltage in rectifier
$U_d^I$ = DC-voltage in inverter
R = Line resistance The DC-voltages are controlled by the firing and extinction angles and the tap changers in the way described in chapter 7 of reference 4.

SUMMARY OF THE INVENTION

This invention describes an arrangement and related couplings for direct transformation of electric power from one DC voltage to another. The arrangement is composed of an inverter bridge (24), converter transformers (25) and a rectifier bridge (26), in which the firing sequence of the valves (27) is adjusted, so that both bridges generate variating electromagnetic fields of opposing polarity in the transformer cores with related windings.

Figure 2:
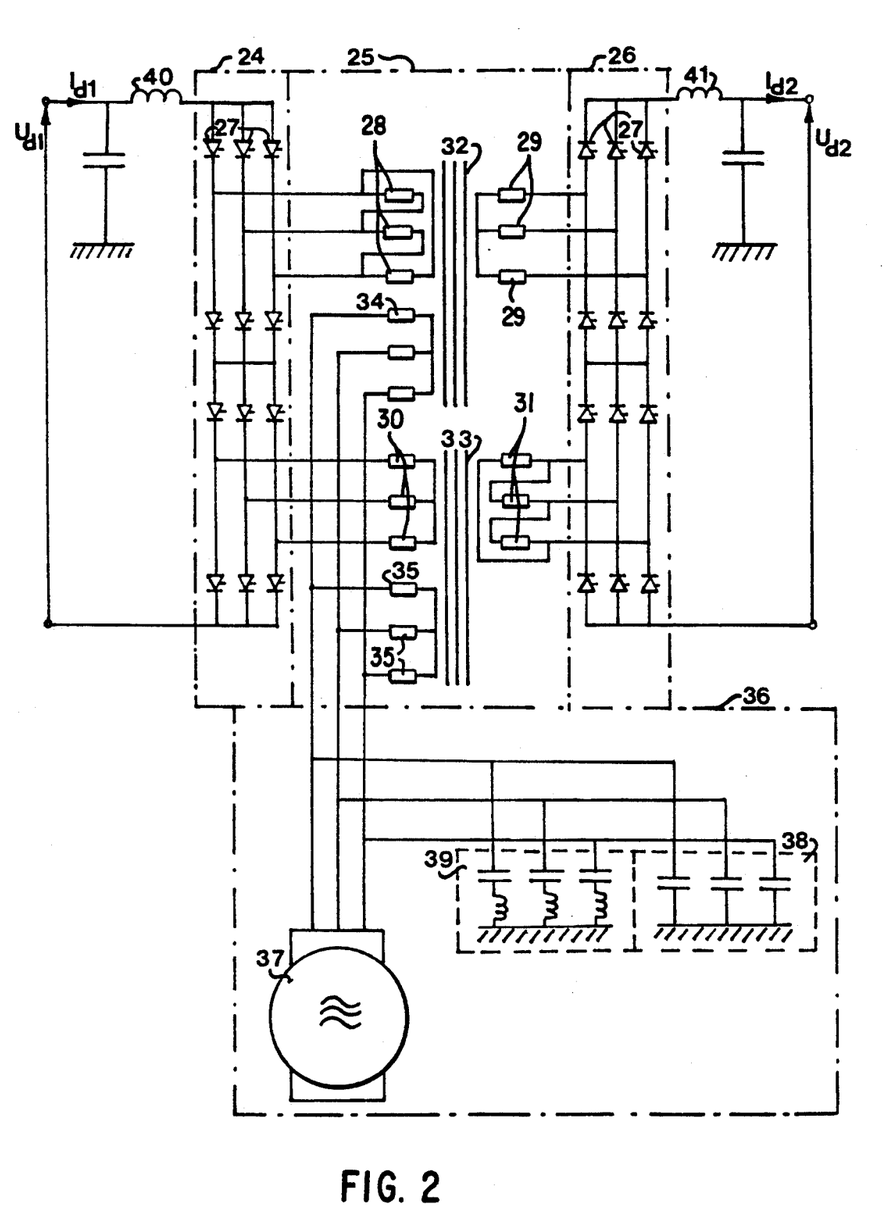
In FIG. 2 is shown the proposed arrangement of a 12 pulse line commutate DC/DC power transformer.

If the converter transformer in converters having only one valve winding (16, 18, 17, 19) are provided with two galvanically isolated valve windings (28 resp. 29, 30 resp. 31), on all phases, these valve windings can be connected to two independent bridges (24 resp 26). These independent valve bridges can now follow two different cyclic firing sequences. By arranging the phase shift between the valve windings from the two bridges, opposing magnetic fields can be created in the core(s) of the converter transformer(s) (32, 33). By driving one of the valve bridges as an inverter (25) and the other valve bridge as a rectifier (26), power can be transformed from one DC-voltage level ($U_{d1}$) to another ($U_{d2}$). The relation in voltage and current is thus determined by the turns ratio in the two valve windings from the two valve bridges. If line commutated valves are used the firing and extinction must be achieved with certain delay angles in relation to an AC reference voltage winding. An AC voltage winding (34, 35) can be connected to each phase and transformer unit for this purpose. This winding is connected to an AC voltage reference net (36), with one bus bar per phase.

The air of this AC-voltage reference net is to form a voltage reference against which the delay angles of the rectifier and inverter bridges are referred. Sufficient power for the AC voltage reference may be externally generated or supplied by a three phase synchronous generator (37). The synchronous generator may also by itself or in parallel with shunt capacitor banks (38) provide reactive power corresponding to the reactive power consumption of the line commutated DC/DC power transformer due to the delay angles. AC-filters (39) may also be connected to the reference net in order to take care of current harmonics generated during the rectification and inversion processes.

The principle of the known bridge coupling in that an AC voltage connected to a transformer core will provide a cyclically varying magnetic field. This variating magnetic field generates, through the turns ratio, voltages in the other windings connected to the same core. The cyclic firing sequence in the valve bridges (8, 9) will result in DC voltages with a certain ripple over the valve bridges. The smoothing reactors (14, 15) inhibit this voltage ripple to pass on to the DC lines. When the coupling is provided with a load, current is withdrawn. The current is transformed over the transformer core according to the principle of ampere turns ratio balance. This process is explained in chapter 3 of reference 1.

The principle of the invention described herein is that the valve windings of the inverter bridge (24) may generate a cyclically variating magnetic field in a respective transformer core (32, 33). By means of a co-variating the cyclic firing sequence in the rectifier bridge (26) the thus induced voltages will build up a DC voltage ($U_{d2}$) over the rectifier bridge, which generates an opposing magnetic field in the core. When the rectifier bridge is provided with a load, current will be transformed according to the principle of ampere turns ratio balance between primary and secondary windings of a transformer, if self commutated vales are utilized, no further windings are needed, since the cyclic sequence with forced commutation will lead to currents being commutated from one phase to another according to a predetermined frequency.

Figure 4:
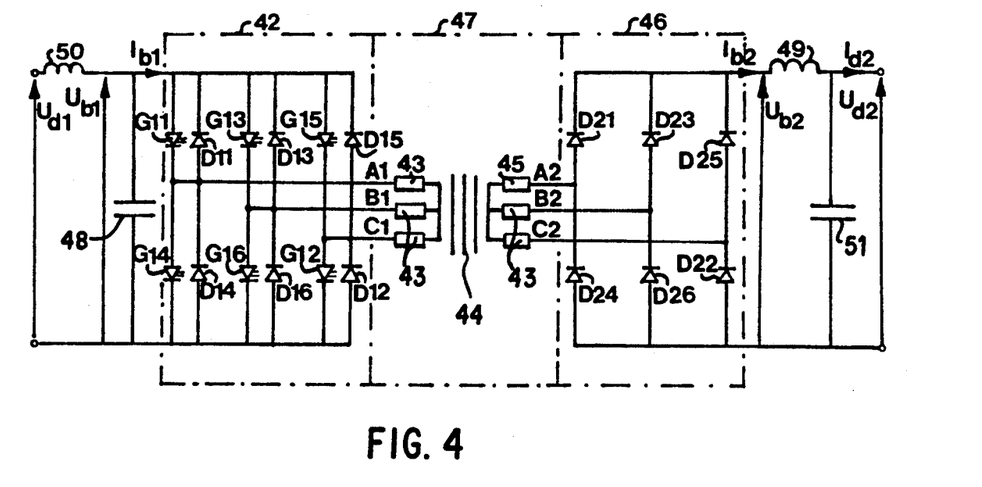
In FIG. 4 is shown the circuit diagram of a sixpulse self commutated DC/DC power transformer.

A self commutated inverter for conversion of high voltage DC to three phase AC is known and described in chapter 6.1 of reference 3. In FIG. 6.1 of this reference the inverter is shown. Such a bridge coupling may be used as inverter bridge (42) in a self commutated DC/DC power transformer as illustrated in FIG. 4. In the known bridge coupling two opposing thyristors are always on. In the bridge coupling described here, on the contrary, only one thyristor in each three pulse group shall be on at the same time. Through the cyclic firing and extinction sequence of the thyristors (G11–G16): G11→G12→G13→G14→G15→G11→... a variating electromagnetic field is generated by the valve windings (43) in the transformer windings and its core (44). The diode valves (D11–D16) commutate the current when an opposite valve has extinguished. When for example the thyristor valve G11 extinguishes the current will continuer through winding A1 due to the transformer leakage inductance. The voltage in the blocked direction of the thyristor valve will therefore rapidly raise until the diode valve D14 starts to conduct. A commutating voltage has been built up which commutates the current through the winding. The valve windings (43) from such an inverter (42) may be wound on the same transformer core (44) as the valve windings (45) connected to a rectifier (46) built up of diode valves (D21–D26). Such an inverter generates an electromagnetic field, which induces voltages in the valve windings (45) of the rectifier. By means of the diode valves (D21–D26) in the bridge coupling (46) these voltages are rectified.

Figure 3:
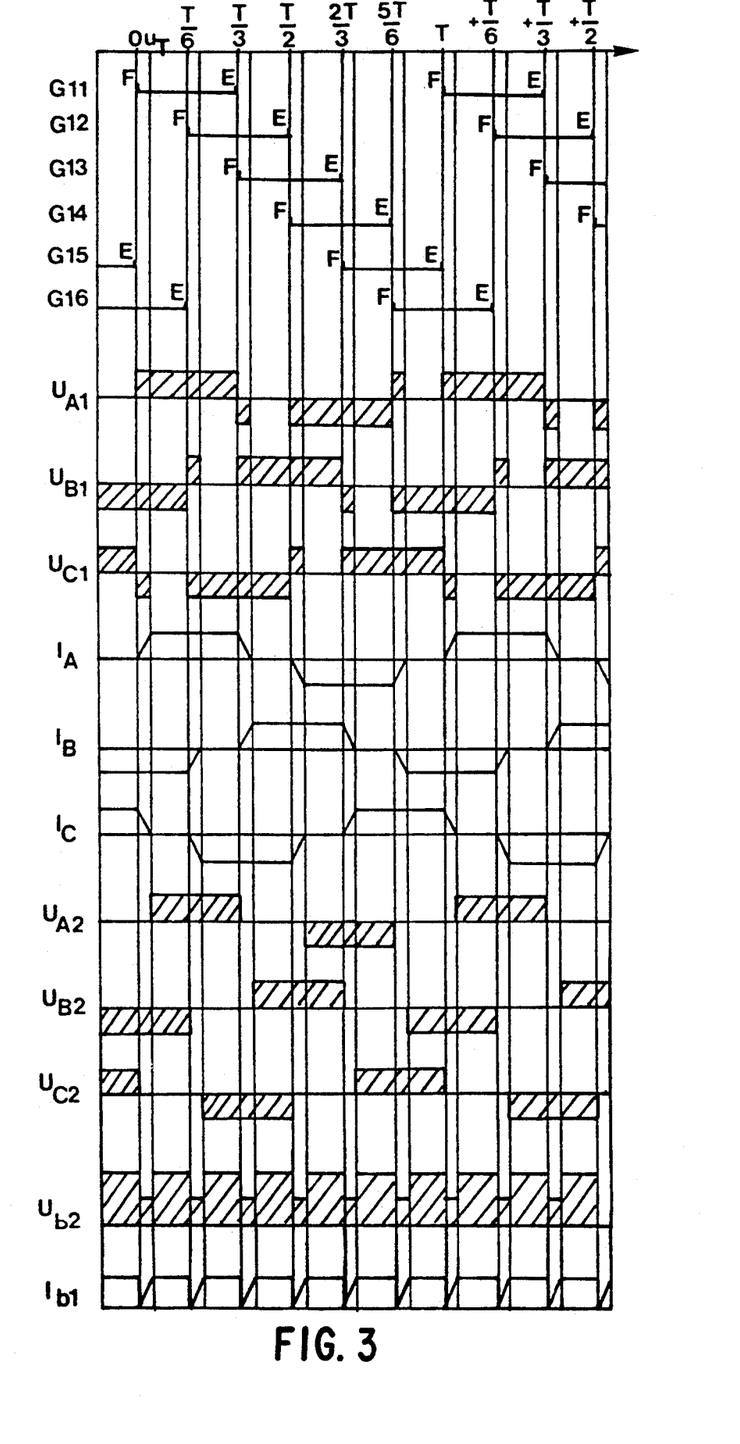
In FIG. 3 is illustrated the valve voltages and currents of a self commutated sixpulse DC/DC power transformer.

The firing and extinction sequence of the inverter is designed so that the thyristor valves (G11–G16) will be extinguished and fired in a cyclic sequence, as shown in FIG. 3, where:

T = Time of a cycle
F = Firing signal
E = Extinction signal $$u_T = \text{Overlap} = \frac{u}{360} \cdot T(p.u.)$$

$U_{A1}$, $U_{B1}$, $U_{C1}$ = Phase voltages in inverter valve windings (p.u.)
$U_{A2}$, $U_{B2}$, $U_{C2}$ = Phase voltages in rectifier valve windings (p.u.)
$U_A$, $U_B$, $U_C$ = Phase currents (p.u.)

Two valves connected to different transformer windings are always on, e.g. in time interval $$\left(0 - \frac{T}{6}\right)$$

the G11 connected to A1 and the G16 connected to B1 are on. The voltage over the inverter bridge ($U_{b1}$) will distribute uniformly over these windings. If we first regard the interval outside the commutation, i.e.

$$\left(u_T - \frac{T}{6}\right),$$

the whole DC current will flow through both valve windings A1 and B1 and be transformed by ampere turns ratio balance to valve windings A2 and B2 respectively. Since positive voltage is created in the connection point of A2 and currents flows in this direction, the diode valve D21 will conduct in the forward direction. The diode valve D26 will conduct current into valve winding B2 from negative polarity. A positive voltage ($U_{b2}$) is thus created over the rectifier bridge. The commutation process for the self commutated DC/DC power transformer is most easily described by an example. For example, consider the interval $$\left(\frac{T}{6}, \frac{T}{6} + u_T\right)$$

when the current is commutated from thyristor vale G16 to thyristor valve G12. G16 is ordered to extinguish and a firing signal is emitted to valve G12. The valve windings B1 and B2 will continue to conduct current in the same direction as before due to the leakage inductance of the transformer. The voltage over valve G16 will therefore increase rapidly in the blocking direction, until the diode (D13) of the opposite valve starts to conduct.

Then a voltage is built up over the valve winding opposing the current flowing through it. This voltage will de-commutate the current through the winding. At the same time the positive voltage over valve winding C1 will increase the current through this winding with a current derivative determined by the relation between applied commutating voltage and the transformer leakage inductance. When the entire current has commutated over from B1 to C1 the diode valve D13 extinguishes. Since the current extinction of the bridge current ($I_{b1}$) happens almost momentarily, while the current increase is gradual, a saw tooth formed ripple is created in the bridge current of the inverter ($I_{b1}$ of FIG. 3). The same current changes which have occurred on the inverter valve winding will also occur in corresponding windings in the rectifier due to the ampere turns balance. Here the current only commutates between valves in the same direction. The bridge current in the rectifier ($I_{b2}$) will therefore not present a corresponding ripple.

During the commutation process, the commutating voltages are not transferred to the rectifier bridge. A six pulse ripple in voltage will therefore occur in the rectifier ($U_{b2}$ in FIG. 3). In order to isolate this voltage ripple from the DC-line a smoothing reactor (49) may be placed inside the DC filter (51).

When the thyristor valve G16 extinguishes and G12 is fired a closed current loop is formed on the rectifier side over the diode valve D26, the valve windings B2 and C2 and diode valve D22. The current will only flow in this loop until the valve winding B2 has de-commutated the current to winding C2. Then the diode valve D26 extinguishes. Thus the commutation is completed. The turns ratio of the self commutated DC/DC power transformer $N_1:N_2$ determines the relation between the bridge voltages of the rectifier and the inverter $U_{b1}:U_{b2}$ and the bridge currents $I_{b2}:I_{b1}$, where $N_1$ = number of turns in the valve winding of the inverter (43) and $N_2$ = number of turns in the valve winding of the rectifier (45). The inverter side DC line current, $I_{d1}$, is determined by the average value of the bridge current $$I_{d1} = I_{b1}/(1 - 3u_T/T).$$

The rectifier side DC line voltage, $U_{d2}$, is determined, by the average value of the bridge voltage $$U_{d2} = U_{B2}(1 - 3u_T/T)).$$

Figure 5:
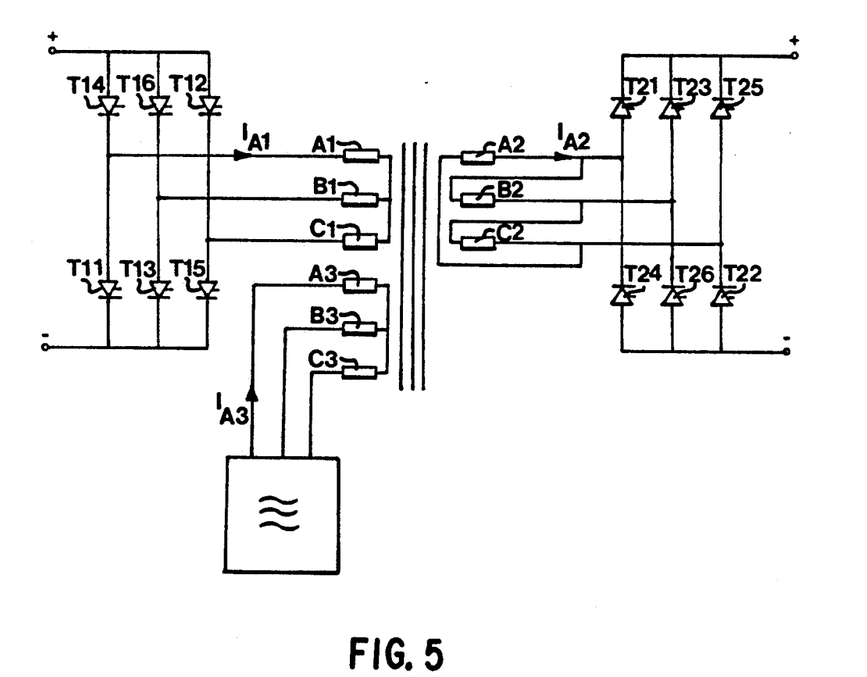
In FIG. 5 is shown the circuit diagram of a six pulse line commutated DC/DC power transformer.
Figure 6:
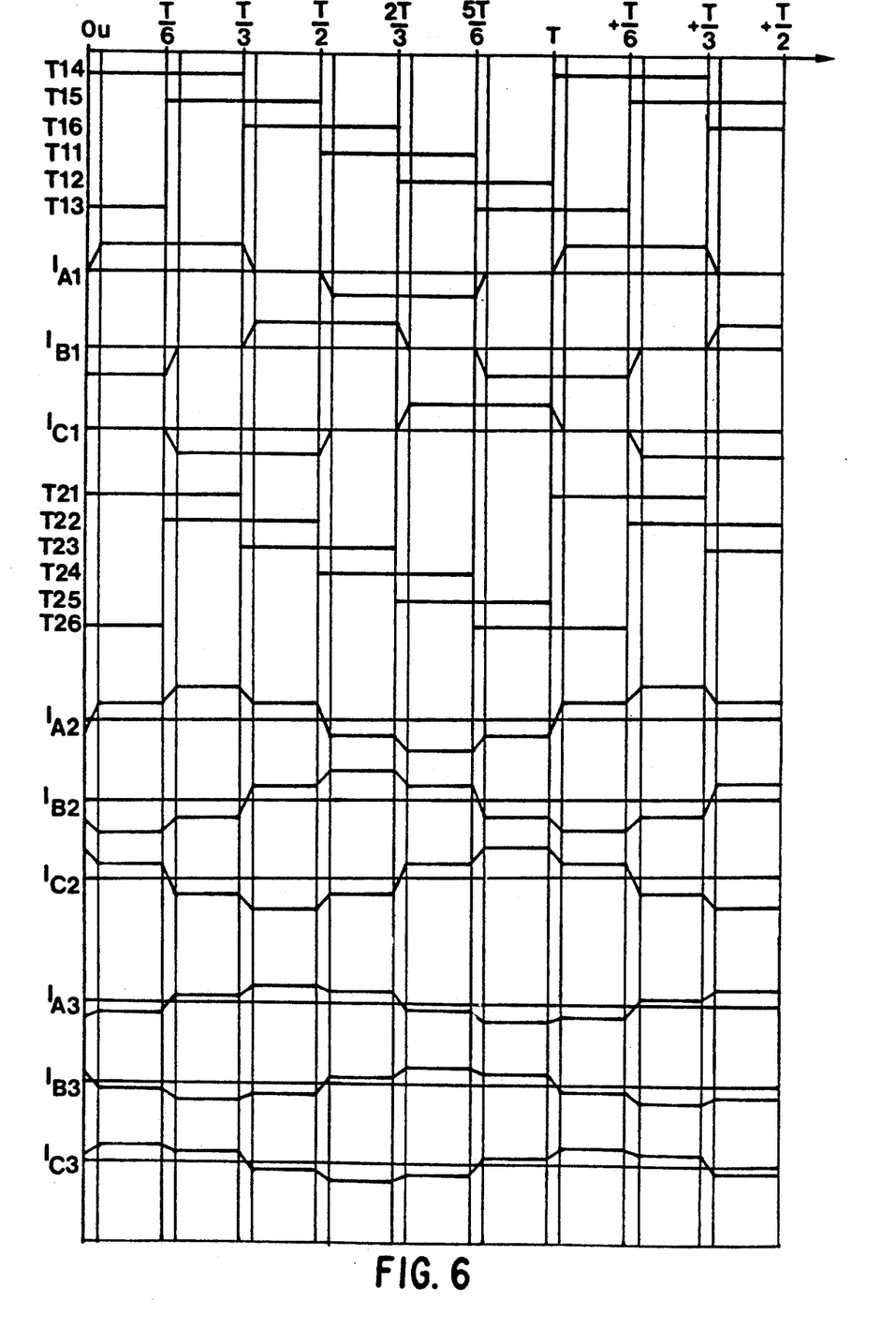
In FIG. 6 is shown the firing and extinction sequence with valve currents of a 12 pulse line commutated DC/DC power transformer.

The effective turn ratio of the DC/DC power transformer is therefore a function of the load ($=U_{d1}:U_{d2} = I_{d2}:I_{d1} = N_1:N_2 (1-3u_T/T)$). The principle for the firing and extinction of the line commutated DC/DC power transformer is illustrated in FIGS. 5 and 6. A schematic circuit diagram for a six pulse group is given in FIG. 5, with the thyristor valves of the rectifier (T21-T26), the valve winding of the rectifier (A2, B2, C2), the inverter thyristor valves (T11-T16), the inverter valve windings (A1, B1, C1) and the windings to the AC voltage reference (A3, B3, C3). The letters in these designations determines the phase of respective winding.

The firing sequence of the six pulse group of the line commutated DC/DC power transformer is shown in FIG. 6. The control pulses for the thyristor valves connected to the inverter are indicated by T11→...→T16. The control pulses show the time interval when a valve shall be on and provided with firing pulses as soon as the blocking voltage becomes positive. The currents to the inverter in a star connected valve windings are denominated $I_{A1}$, $I_{B1}$, $I_{C1}$. The control pulses for the thyristor valves connected to the inverter are indicated by T21→...→T26. The current to the rectifier in delta connected valve windings are denominated $I_{A2}$, $I_{B2}$, $I_{C2}$. The differences between these currents corrected with respect to turns ratio are the ampere turns differences which each phase of the AC windings must compensate for. These AC currents denominated $I_{A3}$, $I_{B3}$, and $I_{C3}$ are shown in FIG. 6. The AC voltage reference currents may through Fourier analysis be regarded as a summary of a fundamental component, phase shifted 90° after the voltage and a number of harmonics. The fundamental current component in the AC reference net represents the reactive power which must be provided to the DC/DC power transformer. The harmonics are compensated by the AC-filters connected to the AC reference net.

Figure 7:
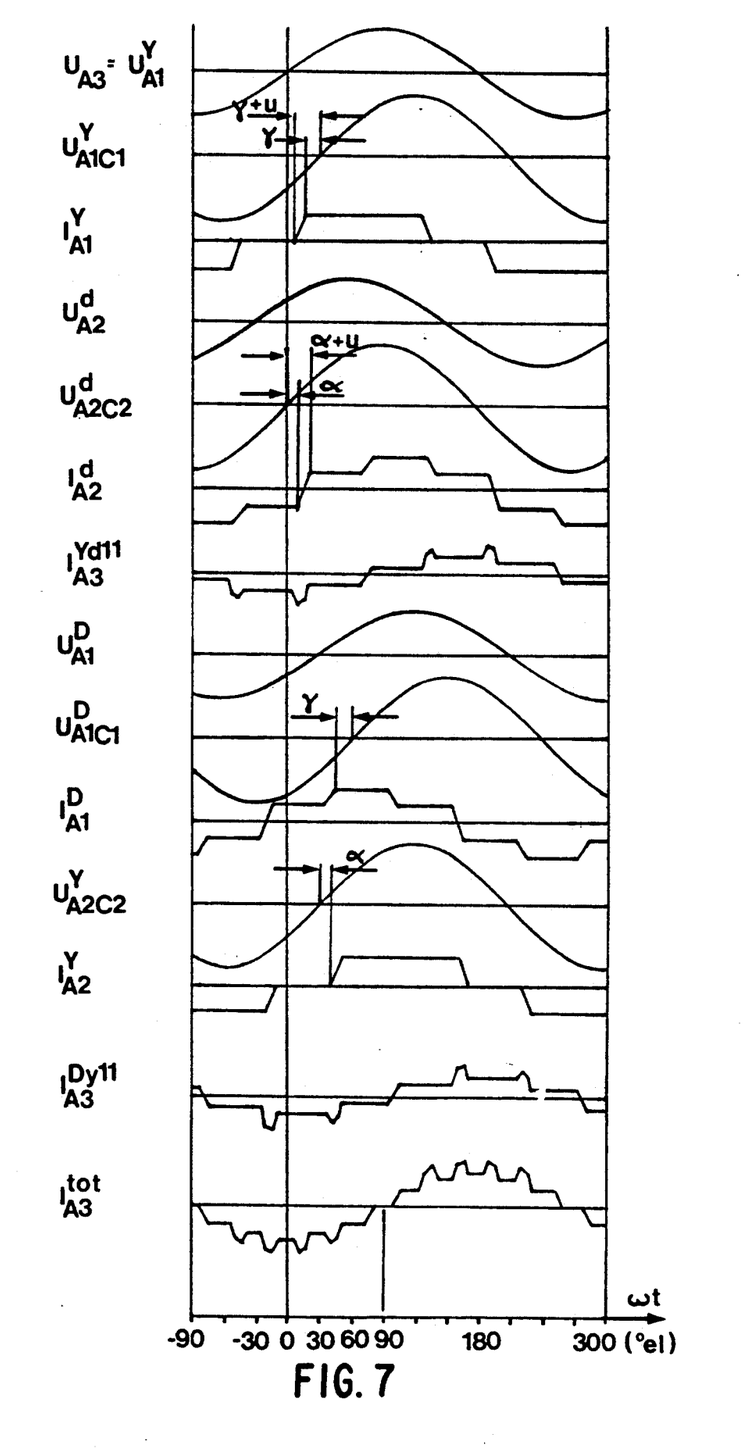
In FIG. 7 is shown the valve and winding currents and voltages of a 12 pulse line commutated DC/DC power transformer.

The commutation process of the line commutated DC/DC power transformer is illustrated in FIG. 7. The AC voltage reference is exemplified by the phase voltage $U_{A3}$, which in the example in FIG. 5 is in phase with the phase voltage of the inverter $U_{A1}$. The commutation from valve T12 to valve T14 is achieved by the commutation voltage $UY_{A1C1}{}^y$, which is the difference between the two phase voltages $U_{A1}{}^Y$ and $U_{C1}{}^Y$. $U_{C1}{}^Y$ is phase shifted 120° el before $U_{A1}{}^Y$, while $U_{A1C1}{}^Y(\omega t) = U_{A1}{}^y(\sin \omega t - \sin(\omega t + 2\pi/3)) = \sqrt{3}\, U_{A1}{}^Y \sin(\omega t - \pi/6)$, i.e. $U_{A1C1}{}^Y$ is phase shifted 30° after $U_{A1}{}^Y$. Commutation from thyristor valve T12 to valve T14 starts with firing of valve T14 at the instant when an angle ($\gamma + u$) remains before the phase-to-phase voltage $U_{A1C1}{}^Y$ becomes zero. The commutation voltage $U_{A1C1}{}^Y$ commutes the direct current from valve winding C1 to valve winding A1 during the commutation interval "u". The DC-current through winding A1 is demonstrated as $I_{A1}{}^Y$ in FIG. 7. In the example in FIG. 5 the valve winding of the rectifier is phase shifted 30° before the inverter by means of a $Y_d11$ coupling. The phase voltage $U_{A1}{}^d$ is thus phaseshifted 30° before the AC reference winding voltage. The phase-to-phase voltage $U_{A2C2}{}^d$ comes 30° after the phase voltage and is consequentially in phase with the AC reference winding voltage. The commutation from thyristor valve T25 to thyristor valve T21 in the inverter starts α degrees after zero passage of the phase-to-phase voltage $U_{A2C2}{}^d$ and ends u degrees later. After commutation of the DC current to the valve T21 the DC current in the rectifier will pass through valve T26 and windings C2 in series with A2 parallel to the winding B2. During this time T21 and T26 conduct only a third of $I_{d2}$ flows through winding A2. When the valve T26 commutes the current to the valve T22 the DC-current will pass through winding A2 parallel to windings C2 in series with B2. Then the DC-current through winding A2 will increase to $\frac{2}{3}I_d$ and so on in the way illustrated by current $I_{A2}{}^d$ in FIG. 7. The current amplitude $I_{A2}{}^d$ is expressed in per unit valve, referring to the AC reference winding side, and is therefore multified with factor $\sqrt{3}$ as turns ratio factor for delta connected windings.

The differential current, $I_{A3}$, between rectifier and inverter windings of phase A, is delivered to the AC reference winding. If the summary angle ($\alpha + \gamma + u$) is the same as the phase shift between these two, this current will have the smooth shape as in FIG. 6. Otherwise current peaks will occur in the way demonstrated by current $I_{A3}Y_d11$ in FIG. 7. In order to minimize current harmonics it is therefore desirable to control the summary angle $(\alpha+\gamma+u)$ against the same value as the phase shift between rectifier and inverter valve windings.

DESCRIPTION OF THE PREFERRED EMBODIMENTS

The circuit diagram of a six pulse self commutated DC/DC power transformer is shown in FIG. 4. As already mentioned a voltage ripple is created on the rectifier side due to the commutation process. In order to isolate this voltage ripple from the dc line a smoothing reactor (49) may be connected to the valve bridge and a dc filter (51) outside the smoothing reactor.

The dc-commutation with the diodes (D11-D16) on the inverter side generates a six pulse ripple in the current ($I_{b1}$ in FIG. 3), which with a finite dc capacitor (48) will result in a certain voltage ripple also over this valve bridge. In order to reduce current and voltage ripple the dc capacitor may be designed as a filter. If two six pulse bridges (42) shifted 30° between each other with respect to firing and extinction sequence are series connected the voltage ripple will be reduced and its frequency doubled. The remaining voltage harmonics are absorbed by the smoothing reactors (49, 50).

FIG. 4 demonstrates that the self commutated DC/DC power transformer can only transmit power from the inverter side to the rectifier side. If power transmission is desired in both directions the rectifier bridge (46) may be exchanged to another inverter bridge (42), provided with self commutated thyristors and antiparallel connected diodes, where the former are deactivated during rectifier operation. The power transmission direction is thereby determined by which of the two bridges is activated in inverter mode through forced firing and extinction sequence. The DC-filter (48) is connected to either side of the smoothing reactor depending upon power flow direction. In principle the valves in the inverter are built up of self-commutated thyristors (G11-G16) antiparallel connected diodes (D11-D16), which for high voltages must be series connected and provided with common voltage divider elements and heat sinks.

A self commutated DC/DC power transformer built up according to the principle described here may have normal current control for dc lines as described in chapter 7 and reference 4. The current through the transformer is determined by the difference in voltage between power source net and power load net, and pulse frequency, since these affect the transformer turns ratio $N_1:N_2(1-3u_T/T)$. The control system of the transformer substation should be provided with protections against blocking by dc line fault and other short circuits which create harmful overcurrents and overvoltages.

The necessary commutation voltage for the line commutated valves is most easily provided by an AC voltage reference winding connected to each transformer unit and phase. The AC voltage reference (36) generates a sinusoidal flow in the core. The rectifier and inverter bridges set their delay angles in relation to this reference voltage.

In order to maintain the ampere turns balance in each transformer core (32, 33) the windings in the rectifier and inverter bridges are phase shifted, so that the valve windings from respective rectifier and inverter bridges simultaneously conduct as much as possible to achieve the best ampere turns balance. As a consequence of the firing, extinction and overlap angles the phase shift between rectifier and inverter can never be completely balanced out on a transformer core. A reactive power deficit occurs that must be compensated by the AC voltage reference winding (34, 35). The necessary reactive power can be supplied from asynchronous generator (36) or via thyristor- and/or breaker switched shunt capacitor banks, if necessary in combination with SVC control of known technology, described in chapter 10 of reference 4.

In the presently known thyristor valves the firing angle $(\alpha)$ in the rectifier is normally controlled between 5° and 20°. In the invertor the extinction angle is normally kept over 17°. Normal values of the overlap angle are 10°–15°. With these delay angles the summary angle $(\alpha+\gamma+u)$ of the DC/DC power transformer becomes between 30° and 60°. With improved firing and extinction characteristics the nominal value of the summary angle $(\alpha+u+\gamma)$ should be possible to reduce. In the example in FIG. 2 a phase shift between rectifier and inverter of 30° has been chosen. This is achieved by couplings Yd11 and Dy11 according to SEN 270101. In order to achieve greater phase shifts the valve windings of either one or both sides can be connected in a Z-coupling or with extended delta.

By series connection of six pulse bridges in the rectifier and inverter phase shifted in relation to each other and to the AC windings the current harmonics are reduced in the same manner as for the known 12 pulse converter (see reference 1 chapter 8.2), which reduces necessity for harmonic AC-filters (39). The phase and phase-to-phase voltages and different phase A transformer winding currents of the line commutated DC/DC power transformer in FIG. 2 are shown in FIG. 7. In this example the delay angles are $\alpha=10°$, $\gamma=15°$ and $u=10°$.

The valve winding currents of the six pulse group with Yd11 coupling are denominated $I_{42}{}^d$ in the rectifier and $I_{41}{}^Y$ in the inverter.

Figure 8:
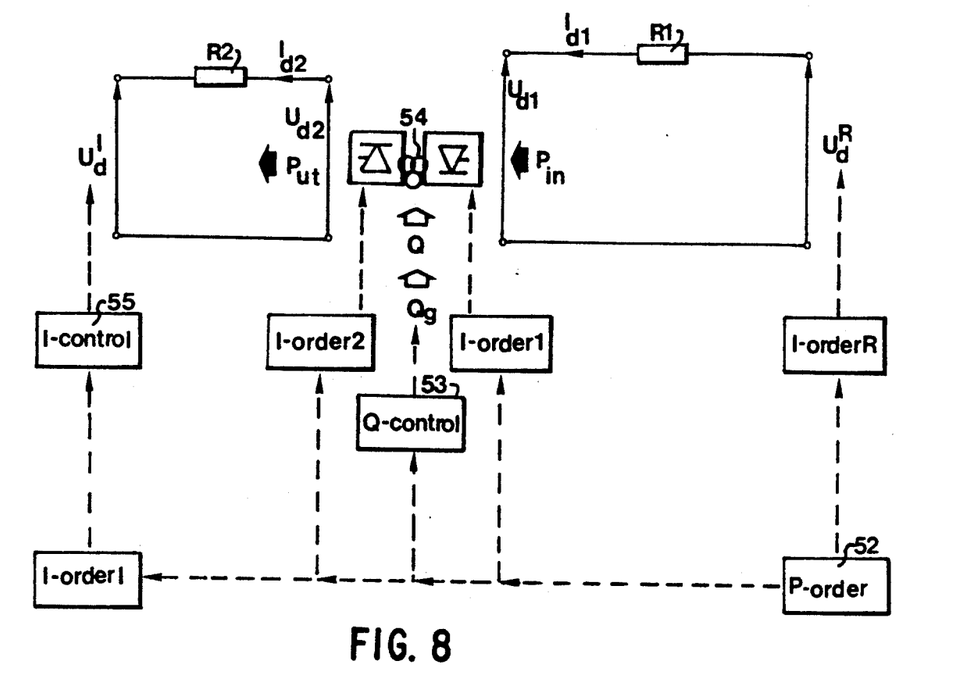
In FIG. 8 is shown the power control strategy of a line commutated DC/DC power transformer.

Corresponding AC reference winding current, $I_{43}{}^{Yd11}$, equals the difference between these currents. The valve winding currents of the other Dy11-coupled six pulse group are in the rectifier $I_{42}{}^Y$ and in the inverter $I_{41}{}^D$ and is deduced in the same manner as for the first six pulse group. The difference between these currents, $I_{43}{}^{Dy11}$, is the corresponding AC reference winding current. The summary of $I_{43}^{Yd11}$ and $I_{43}^{Dy11}$ is the total phase current, $I_{43}^{tot}$, which the AC reference winding shall supply to the DC/DC power transformer. The fundamental component of this current is the reactive power current of the DC/DC power transformer phaseshifted 90° after the voltage. The spikes in this current result because the summary angle $(\alpha+\gamma+u)$, in this case $(=35°)$, deviates from the phaseshift between rectifier and inverter $(=30°)$. In order to achieve a greater phase shift between the valve windings of the rectifier and inverter, the rectifier windings can be connected into a "Z" or to an extended delta phase shifter $x°$ before the AC reference winding. The phase shift x can be designed freely between 0° and 30°, through choice of number of turns between the delta and star part of the extended delta. The inverter valve winding can at the same time be connected to a delta, phase shift 30° after the AC reference winding. In this manner any desired phase shift between 30° 60° can be obtained. The phase shift between the two in all other respect equal series connected six pulse groups can be obtained by star-connection of one of the AC reference windings and delta connection of the other. This procedure is demonstrated for the autocoupled DC/DC power transformer in FIG. 10. In order to minimize the current harmonics the phaseshift between rectifier and inverter should, be chosen so that it coincides with normal stationary operational value of the summary angle $(\alpha+\gamma+u)$. The control of the line commutated DC/DC power transformer may also be adjusted for control against nominal value of the summary angle. The control system of high voltage DC transmission is known and described in chapter 7 of reference 4. For a DC/DC power transformer with lien commutated valves certain additional control parameters are to be considered due to the influence of the AC voltage reference net. FIG. 8 illustrates schematically the power control of the line commutated CD/CD power transformer (54). The current control of each converter is performed in the known manner. The coordination between the different current orders and the voltage of the AC voltage reference net assures that balance is maintained between incoming ($P_{in}$) and outgoing ($P_{ut}$) active power. The balance between the consumption of reactive power (Q) and the generation of reactive power (Qg) provided by AC voltage reference net is controlled by the reactive power control (53).

The power order (52) is set in one of the stations, for example in the rectifier of the supplying dc-network. From here current orders to the entire dc-net are emitted. The power change may not be faster that what the reactive power control of the DC/DC power transformer permits. The current order between supplying net ($I_{orderR}$) and the supplied net ($I_{orderI}$) and the inverter of the DC/DC power transformer ($I_{order1}$) and its rectifier ($I_{order2}$) are coordinated. Normally current orders are set so that inverters control the voltage, while the rectifiers control the current. Increased stability on the AC voltage reference net is achieved i also the current control (55) in the inverter of the supplied ac-network is allowed to control the current ($I_{d2}$) in the supplied dc-net.

Figure 9:
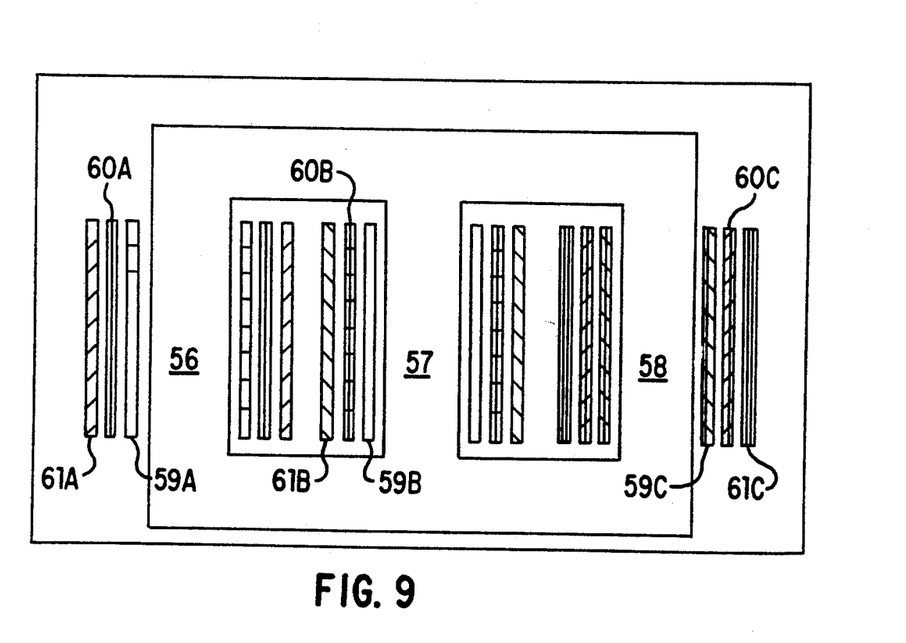
In FIG. 9 is shown a physical configuration of the valve windings in a three phase DC/DC power transformer.

The different windings in the DC/DC power transformer (28-31, 34-35) may all be placed in one and the same transformer unit. In its most compact form, which probably only is applicable on lower powers, all windings are placed in one transformer unit. In FIG. 9 such a threephase three phase three winding is shown, for example for windings 30, 31, 35 and core 33 in FIG. 2. Each transformer core leg (56, 57, 58) has been provided with three windings from the same phase. The innermost windings (59A, 59B, 59C) are in this case the three phases (A, B, C) of the AC reference winding (34). The intermediate windings (60A, 60B, 60C) are in this case the three phases of the inverter valve windings (30) connected into a star. The outmost windings (61A, 61B, 61C) are the three phases of the rectifier valve windings (31), closed in a delta.

The smallest power per unit, which also means the highest number of separate units, is achieved if only one valve winding belonging to each bridge (25 resp 26) and one AC-winding (34, 35) are placed into one unit. The AC voltage reference net (36) then interconnects the different AC windings of each transformer unit for each phase.

In reference 2 a form of series and parallel connections of inverters and rectifiers is shown which is a "D.C. voltage transformation in high tension systems".

Figure 10:
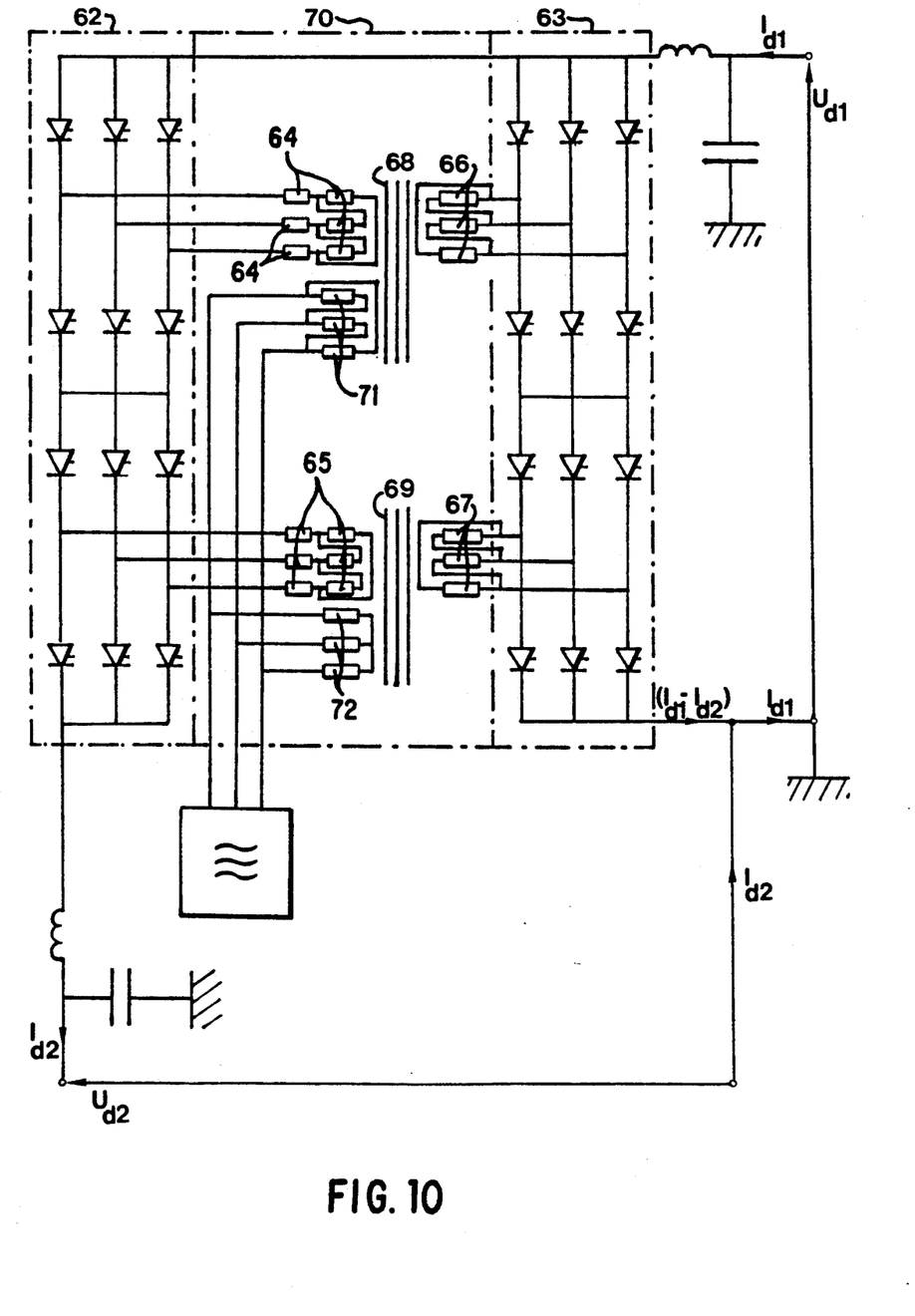
In FIG. 10 is shown the circuit diagram of a 12 pulse line commutated auto DC/DC transformer.

A rectifier (62) and an inverter (63) are connected in opposite directions in a DC voltage transformation point so that power is transformed from one DC voltage level ($U_{d1}$) to another DC voltage level ($U_{d2}$) without sectioning power. If the valve windings of the rectifier (64, 65) and of the inverter (66, 67) in these combined bridges are connected to the same transformer core (68, 69) an auto coupled DC/DC power transformer is achieved as shown in FIG. 10. The rectifier bridge (62) is cascade connected to the inverter bridge (63). With this autocoupling the high voltage valve bridge is designed for the difference in voltage ($U_{d2}-U_{d1}$) and the low voltage valve bridge is designed for the difference in current ($I_{d1}-I_{d2}$). The result is that less costly equipment is needed, lower losses are generated and less reactive power is consumed as compared with a more basic concept.

FIG. 10 depicts how the rectifier valve windings (64, 65) are phase shifted 45° before the inverter valve windings (66, 67) and how at the same time 30° phase shift is achieved between the two AC reference windings (71, 71).

The auto coupling is of course also suitable for DC/DC power transformer with self commutated valves.

REFERENCES

Ref. 1: E. W. Kimbark "Direct Current Transmission", Volume I, 1971 by John Wiley & Sons.

Ref. 2: Kanngiesser U.S. Pat. No. 3,942,089 May 1976 "DC Voltage Transformation in High Tension Systems".

Ref. 3: K. Thorborg "Power Electronics", 1988, Prentice-Hall International (UK) Ltd.

Ref. 4: A. Ekström "Kompendium i Högeffektelektronik", KTH/EKC January 1988.

I claim:

1. An arrangement for transformation of high electric power from one DC voltage level to another DC voltage level, comprising a transformer with a core, a first valve bridge having valves, said first valve bridge comprising at least one six-pulse inverter bridge which includes a plurality of said self-commutated thyristors and further comprising a plurality of diodes, each diode of said plurality of diodes being connected antiparallel to a self-commutated thyristor, and a second valve bridge having valves, said second valve bridge comprising a six-pulse rectifier bridge which includes a plurality of diode valves, one of said first valve bridge and said second valve bridge being a rectifier bridge and the other of said first valve bridge and said second valve bridge being an inverter bridge, first valve windings being wound around said core and connected to said valves of said first valve bridge and second valve windings being wound around said core and connected to valves of said second valve bridge, said first valve windings and said second valve windings being galvanically isolated, and means for cyclically firing said valves in said first valve bridge and said valves in said second valve bridge so that variating electromagnetic fields of opposing polarity are generated in said core by said first valve windings and said second valve windings, said valves of said first valve bridge comprising self-commutated thyristor valves connected to a DC voltage source which supplies DC voltage at said one DC voltage level, and further wherein a capacitor is provided external of said first valve bridge and connected between said DC voltage source and said self-commutated thyristor valves, whereby said variating electromagnetic field generated by said first valve bridge is provided by sequentially firing and extinguishing said self-commutated thyristor valves, electromagnetic energy stored by said core being commutated from said first valve windings to said second valve windings by said capacitor, and voltages and currents induced in said second valve windings being rectified so that electric energy is transformed to said another DC voltage level.

2. An arrangement according to claim 1 wherein said plurality of self-commutated thyristors and said plurality of diodes is built up having a common voltage divided and common cooling.

3. An arrangement for transformation of high electric power from one DC voltage level to another DC voltage level, comprising a transformer with a core, a first valve bridge having valves and a second valve bridge having valves, one of said first valve bridge and said second valve bridge being a rectifier bridge and the other of said first valve bridge and said second valve bridge being an inverter bridge, first valve windings being wound around said core and connected to said valves of said first valve bridge and second valve windings being wound around said core and connected to valves of said second valve bridge, said first valve windings and said second valve windings being galvanically isolated, and means for cyclically firing said valves in said first valve bridge and said vales in said second valve bridge so that variating electromagnetic field of opposing polarity are generated in said core by said first valve windings and said second valve windings, said valves of said first valve bridge comprising self-commutated thyristor valves connected to a DC voltage source which supplies DC voltage at said one DC voltage level, and further wherein a capacitor is provided external of said first valve bridge and connected between said DC voltage source and said self-commutated thyristor valves, whereby said variating electromagnetic field generated by said first valve bridge is provided by sequentially firing and extinguishing said self-commutated thyristor valves, electromagnetic energy stored by said core being commutated from said first valve windings to said second valve windings by said capacitor, and voltages and currents induced in said second valve windings being rectified so that electric energy is transformed to said another DC voltage level, wherein said first valve bridge is a first inverter bridge and said second valve bridge is a second inverter bridge, said first valve bridge and said second valve bridge each comprising self-commutated thyristors, each self-commutated thyristor being connected antiparallel to a respective diode whereby power flow is determined by how an in which valve bridge cyclic firing and extinction is applied.

* * * * *